(12) United States Patent
Chang (10) Patent No.: US 9,688,875 B2
(45) Date of Patent: Jun. 27, 2017

(54) EPOXY COATING SYSTEMS USING POLYCYCLIC POLYAMINES AS EPOXY HARDENERS

(71) Applicant: DOW Global Technologies LLC, Midland, MI (US)

(72) Inventor: Kwanho Chang, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 444 days.

(21) Appl. No.: 14/368,183

(22) PCT Filed: Dec. 28, 2012

(86) PCT No.: PCT/US2012/071945
§ 371 (c)(1),
(2) Date: Jun. 23, 2014

(87) PCT Pub. No.: WO2013/102006
PCT Pub. Date: Jul. 4, 2013

(65) Prior Publication Data
US 2014/0349049 A1    Nov. 27, 2014

Related U.S. Application Data

(60) Provisional application No. 61/581,323, filed on Dec. 29, 2011, provisional application No. 61/717,990, filed on Oct. 24, 2012.

(51) Int. Cl.
*C09D 163/00* (2006.01)
*C08G 59/50* (2006.01)
(Continued)

(52) U.S. Cl.
CPC ............. *C09D 163/00* (2013.01); *B05D 1/36* (2013.01); *B05D 3/002* (2013.01);
(Continued)

(58) Field of Classification Search
CPC ............. C09D 163/00; Y10T 428/1355; Y10T 428/31511; C08G 59/5073; C08L 63/00; B05D 1/36; B05D 3/002
See application file for complete search history.

(56) References Cited

U.S. PATENT DOCUMENTS 4,581,454 A    4/1986  Myers et al.
4,582,886 A    4/1986  Ryang
(Continued)

FOREIGN PATENT DOCUMENTS

DE    22 16 925    10/1972
DE    26 20 993    12/1976
(Continued)

OTHER PUBLICATIONS

M. Gougeon, "Gougeon Brothers on Boat Construction: Wood and West System Materials" fifth edition, published Oct. 2005, ISBN-10: 1878207504; ISBN-13: 978-1878207500.

*Primary Examiner* — Michael C Miggins
(74) *Attorney, Agent, or Firm* — Kagan Binder, PLLC (57) ABSTRACT

The present invention relates to epoxy coating formulations that comprise an epoxy functional component comprising at least one epoxy functional ingredient comprising an average of at least 1.5 epoxy moieties per molecule; and an amine functional component comprising at least one polycyclic polyamine that comprises (i) a first cyclic structure comprising a first cyclic backbone, a first tertiary amine moiety having a first tertiary nitrogen atom that is a constituent of the first cyclic backbone, at least one additional amine moiety having a nitrogen atom that is a constituent of the first cyclic backbone, and optionally one or more additional amine moieties present in the cyclic backbone and/or in one or more groups pendant from the first cyclic backbone; (ii) a second cyclic structure comprising a second cyclic backbone, a second tertiary amine moiety having a second (Continued)

tertiary nitrogen atom that is a constituent of the second cyclic backbone, at least one additional amine moiety having a nitrogen atom that is a constituent of the second cyclic backbone, and optionally one or more additional amine moieties present in the cyclic backbone and/or in one or more groups pendant from the second cyclic backbone; and (iii) at least one linking group interconnecting the first tertiary nitrogen atom to the second tertiary nitrogen atom; and wherein the polycyclic polyamine has on average greater than one active amine moiety per molecule.

12 Claims, 5 Drawing Sheets (51) Int. Cl.
C08L 63/00 (2006.01)
B05D 1/36 (2006.01)
B05D 3/00 (2006.01)

(52) U.S. Cl.
CPC .......... *C08G 59/5073* (2013.01); *C08L 63/00* (2013.01); *Y10T 428/1355* (2015.01); *Y10T 428/31511* (2015.04)

(56) References Cited

U.S. PATENT DOCUMENTS

| | | |
|---|---|---|
| 4,990,672 A | 2/1991 | Johnson et al. |
| 5,300,336 A | 4/1994 | Wong et al. |
| 6,224,710 B1 | 5/2001 | Rinde et al. |
| 6,353,080 B1 | 3/2002 | Gan et al. |
| 6,576,297 B1 | 6/2003 | Cameron et al. |
| 7,579,392 B2 | 8/2009 | Gan et al. |
| 7,670,683 B2 | 3/2010 | Mallozzi et al. |
| 7,790,288 B2 | 9/2010 | Perez et al. |
| 2007/0298006 A1 | 12/2007 | Tomalia et al. |

FOREIGN PATENT DOCUMENTS

| | | |
|---|---|---|
| EP | 1 728 788 | 12/2006 |
| GB | 1514513 A | 6/1978 |
| JP | 60 001225 | 1/1985 |
| JP | 62 171146 | 7/1987 |

EPOXY COATING SYSTEMS USING POLYCYCLIC POLYAMINES AS EPOXY HARDENERS

PRIORITY

This application claims the benefit from International No. PCTUS2012/071945, which was granted an International filing date of Dec. 28, 2012, which in turns claims priority under 35 U.S.C. §119(e) of U.S. Provisional Application Ser. No. 61/581,323, filed Dec. 29, 2011, entitled "FORMATION OF HIGHER MOLECULAR WEIGHT CYCLIC POLYAMINE COMPOUNDS FROM CYCLIC POLYAMINE COMPOUNDS" and U.S. Provisional Application Ser. No. 61/717,990, filed Oct. 24, 2012, entitled "EPOXY COATING SYSTEM USING POLYCYCLIC POLYAMINES AS EPOXY HARDENERS", which applications are incorporated herein by reference in their entireties.

FIELD OF THE INVENTION

The present invention relates to curable epoxy compositions that comprise epoxy functional ingredients and amine functional ingredients as epoxy hardeners, wherein at least a portion of the amine functional ingredients include polycyclic polyamines. In particular, the present invention relates to using such compositions to form at least portions of protective coating systems on metallic substrates such as oil and gas pipelines.

BACKGROUND OF THE INVENTION

Thermosetting, epoxy functional compositions are used to form tough, resilient, water-resistant structures such as molded articles, protective coatings, structural composites, adhesives, hardware, equipment housings and components, building components, vehicle components, furniture components, and the like. A typical composition incorporates one or more monomers, oligomers, and/or polymers that are polyfunctional with respect to epoxy functionality. The compositions are cured (e.g., polymerized and/or cross-linked) by chemical reaction with one or more suitable hardeners that are polyfunctional with respect to functionality that is co-reactive with epoxy functionality. Exemplary hardeners include materials that are polyfunctional with respect to at least primary and/or secondary amine and/or OH functionality. Tertiary amine functionality also may be present, although this tends to function mostly as a catalyst for the curing reaction.

According to one exemplary mode of use, epoxy functional compositions are used in coatings systems to protect a wide range of articles against moisture intrusion, corrosion, physical damage, bio-damage, and/or the like. For example, these coating systems are used to protect oil and gas pipelines. These pipelines include many components, particularly pipes, coupling structures, fasteners, and the like that are metallic, often being steel. Exemplary pipeline coatings desirably meet standards promulgated by the Canadian Standard Association (CSA), as these standards guide the pipeline industry on a global basis.

Fusion bonded epoxy (FBE) coatings have been an industrial standard for corrosion protection of oil and gas steel pipelines for more than 40 years. FBE powders are electrostatically sprayed on the heated steel components such as pipe at 220-240° C. The powder melts, fluidly coats the substrate, and then cures to adhere to the pipe surface. The FBE coating provides a primary defense against pipeline corrosion by limiting oxygen permeation. The FBE coating often is used in combination with cathodic protection (CP) that also prevents oxidation of steel by supplying electrons at the affected area. FBE coatings typically are applied either as a stand-alone coating or as a component of a multi-layer system to improve weatherability and the ability to withstand external damage during maintenance, transportation and installation. In multilayer coating systems, the FBE coating functions as a base coating or primer for the top coat(s). A popular multi-layer top coat system is a three layer polyolefin (3LPO) system that utilizes two layers of an adhesive tie layer and an outer HDPE top coat to cover the FBE primer.

The 3LPO system provides excellent coating performance, but nonetheless has drawbacks. As one serious drawback, a typical 3LPO coating is applied using extrusion. Extrusion is very expensive compared to other coating techniques such as spraying. Hence, 3LPO coatings involve substantial capital investment and are very expensive. It would be desirable to provide a coating alternative to the 3LPO system that can be applied using less expensive coating techniques while still meeting CSA standards.

Epoxy coating formulations are under investigation as alternatives to a 3LPO coating system. Investigators face many technical challenges. A first challenge involves providing epoxy formulations that can cure fast to meet throughput goals while still maintaining mechanical performance as demonstrated by tensile, modulus, gouge resistance, and 1 inch bar bending characteristics. While epoxy hardeners are uncovered that provide rapid curing, it is often found that rapid curing is obtained at too high a cost in terms of reduction in mechanical properties.

Epoxy coating formulations are often supplied in two parts so that the epoxy functional and hardener materials are kept separate until the time of use. This prevents the coating formulations from curing too soon. The volumetric ratio at which the separate parts are mixed is very important to ensure efficient mixing and compatibility with inexpensive coating techniques such as high pressure airless spraying. Mixing is more difficult if the ratio of the epoxy part to the hardener part (or vice versa) significantly deviates from unity. It has been found that hardeners that offer suitable mixing ratios may tend to react too slow with the epoxy functional materials. Pipe coatings that involve powder and/or liquid epoxy formulations are described in U.S. Pat. Nos. 7,670,683, 7,790,288, 6,224,710, and 5,300,336.

SUMMARY OF THE INVENTION

The present invention provides epoxy coating formulations that offer favorable cure and volumetric mixing profiles with respect to epoxy and hardener components while maintaining or even enhancing the mechanical properties of the resultant cured coatings. The present invention is based at least in part upon the use of amine functional hardeners that include polycyclic polyfunctional amines. The polycyclic polyfunctional amines have higher reactivity as epoxy hardeners than linear or branched amines used by themselves such as ethyleneamines or polyether amines (e.g., the JEFFAMINE amines) or other nonlinear amines used by themselves such as isophorone diamine or 2-(piperazin-1-yl)ethanamine (AEP). The polycyclic polyfunctional amines are advantageously used in combination with one or more other amines, such as linear or branched amines or other nonlinear amines, to provide blends with better reactivity than if such other amines were to be used without the polycyclic polyfunctional amines.

The polycyclic polyfunctional amines have very high amine equivalent weights, facilitating formulation of hardener and epoxy components with favorable mixing ratios that facilitate efficient mixing. This makes the coating system useful in a wide range of coating applications, including but not limited to the inexpensive yet highly effective high pressure airless spraying. Coatings self level very effectively and have excellent aesthetics. Surprisingly, this significant inventory of advantages is achieved in combination with enhance mechanical properties in terms of modulus, tensile strength, gouge resistance, and flexibility testing according to CSA standards.

In one aspect, the present invention relates to a curable composition, comprising:
- a) an epoxy functional component comprising at least one epoxy functional ingredient comprising an average of at least 1.5 epoxy moieties per molecule; and
- b) an amine functional component comprising at least one polycyclic polyamine, said polycyclic polyamine comprising (i) a first cyclic structure comprising a first cyclic backbone, a first tertiary amine moiety having a first tertiary nitrogen atom that is a constituent of the first cyclic backbone, at least one additional amine moiety having a nitrogen atom that is a constituent of the first cyclic backbone, and optionally one or more additional amine moieties present in the cyclic backbone and/or in one or more groups pendant from the first cyclic backbone; (ii) a second cyclic structure comprising a second cyclic backbone, a second tertiary amine moiety having a second tertiary nitrogen atom that is a constituent of the second cyclic backbone, at least one additional amine moiety having a nitrogen atom that is a constituent of the second cyclic backbone, and optionally one or more additional amine moieties present in the cyclic backbone and/or in one or more groups pendant from the second cyclic backbone; and wherein the polycyclic polyamine has on average greater than one active amine moiety per molecule; and (iii) at least one linking group interconnecting the first tertiary nitrogen atom to the second tertiary nitrogen atom.

In another aspect, the present invention relates to a coated article comprising:
- a) a substrate; and
- b) a coating system provided on at least a portion of a surface of the substrate, said coating system comprising at least one cured coating layer derived from ingredients comprising:
  1) an epoxy functional component comprising at lest one epoxy functional ingredient comprising an average of at least 1.5 epoxy moieties per molecule; and
  2) an amine functional component comprising at least one polycyclic polyamine, said polycyclic polyamine comprising (i) a first cyclic structure comprising a first cyclic backbone, a first tertiary amine moiety having a first tertiary nitrogen atom that is a constituent of the first cyclic backbone, at least one additional amine moiety having a nitrogen atom that is a constituent of the first cyclic backbone, and optionally one or more additional amine moieties present in the cyclic backbone and/or in one or more groups pendant from the first cyclic backbone; (ii) a second cyclic structure comprising a second cyclic backbone, a second tertiary amine moiety having a second tertiary nitrogen atom that is a constituent of the second cyclic backbone, at least one additional amine moiety having a nitrogen atom that is a constituent of the second cyclic backbone, and optionally one or more additional amine moieties present in the cyclic backbone and/or in one or more groups pendant from the second cyclic backbone; and wherein the polycyclic polyamine has on average greater than one active amine moiety per molecule; and (iii) at least one linking group interconnecting the first tertiary nitrogen atom to the second tertiary nitrogen atom.

In another aspect, the present invention relates to a coated pipeline, comprising:
- a) a pipe comprising a metallic surface; and
- b) a coating system provided on at least a portion of the metallic surface of the substrate, said coating system comprising at least one cured coating layer derived from ingredients comprising:
  1) an epoxy functional component comprising at lest one epoxy functional ingredient comprising an average of at least 1.5 epoxy moieties per molecule; and
  2) an amine functional component comprising at least one polycyclic polyamine, said polycyclic polyamine comprising (i) a first cyclic structure comprising a first cyclic backbone, a first tertiary amine moiety having a first tertiary nitrogen atom that is a constituent of the first cyclic backbone, at least one additional amine moiety having a nitrogen atom that is a constituent of the first cyclic backbone, and optionally one or more additional amine moieties present in the cyclic backbone and/or in one or more groups pendant from the first cyclic backbone; (ii) a second cyclic structure comprising a second cyclic backbone, a second tertiary amine moiety having a second tertiary nitrogen atom that is a constituent of the second cyclic backbone, at least one additional amine moiety having a nitrogen atom that is a constituent of the second cyclic backbone, and optionally one or more additional amine moieties present in the cyclic backbone and/or in one or more groups pendant from the second cyclic backbone; and (iii) at least one linking group interconnecting the first tertiary nitrogen atom to the second tertiary nitrogen atom; and wherein the polycyclic polyamine has on average greater than one active amine moiety per molecule.

In another aspect, the present invention relates to a method of forming a coating system on a substrate, comprising the steps of:
- a) providing a substrate comprising a heated, metallic surface;
- b) applying an epoxy functional powder onto at least a portion of the heated surface under conditions such that the powder forms a first, melted, fluid coating on the metallic surface;
- c) while the melted, fluid coating is in an at least partially fluid state, applying a coating composition onto the coated, heated, metallic surface to form a second coating on the heated, metallic surface, wherein the coating composition comprises:
  1) an epoxy functional component comprising at lest one epoxy functional ingredient comprising an average of at least 1.5 epoxy moieties per molecule; and
  2) an amine functional component comprising at least one polycyclic polyamine, said polycyclic polyamine comprising (i) a first cyclic structure comprising a first cyclic backbone, a first tertiary amine moiety having a first tertiary nitrogen atom that is a constituent of the first cyclic backbone, at least one additional amine moiety having a nitrogen atom that is a constituent of the first cyclic backbone, and optionally one or more additional amine moieties present in the cyclic backbone and/or in one or more groups pendant from the first cyclic backbone; (ii) a second cyclic structure comprising a second cyclic backbone, a second tertiary amine moiety having a second tertiary nitrogen atom that is a constituent of the second cyclic backbone, at least one additional amine moiety having a nitrogen atom that is a constituent of the second cyclic backbone, and optionally one or more additional amine moieties present in the cyclic backbone and/or in one or more groups pendant from the second cyclic backbone; and (iii) at least one linking group interconnecting the first tertiary nitrogen atom to the second tertiary nitrogen atom; and wherein the polycyclic polyamine has on average greater than one active amine moiety per molecule; and d) curing the first and second coatings.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. All patents, pending patent applications, published patent applications, and technical articles cited herein are incorporated herein by reference in their respective entireties for all purposes.

The present invention relates to curable admixtures comprising amine functional and epoxy functional ingredients that can be cured to form a wide range of articles. The present invention uses the curable admixtures to form at least portions of epoxy coating systems that use polycyclic polyamines as epoxy hardeners. Consequently, at least one amine functional ingredient comprises at least one cyclic polyamine ("Polycyclic Polyamine") comprising (i) a first cyclic structure comprising a first cyclic backbone, a first tertiary amine moiety having a first tertiary nitrogen atom that is a constituent of the first cyclic backbone, at least one additional amine moiety having a nitrogen atom that is a constituent of the first cyclic backbone, and optionally one or more additional amine moieties present in the cyclic backbone and/or in one or more groups pendant from the first cyclic backbone; (ii) a second cyclic structure comprising a second cyclic backbone, a second tertiary amine moiety having a second tertiary nitrogen atom that is a constituent of the second cyclic backbone, at least one additional amine moiety having a nitrogen atom that is a constituent of the second cyclic backbone, and optionally one or more additional amine moieties present in the cyclic backbone and/or in one or more groups pendant from the second cyclic backbone.

Further, a linking group interconnects the first tertiary nitrogen atom to the second tertiary nitrogen atom. The linking group may be linear, branched, and/or cyclic; aliphatic or aromatic; substituted or unsubstituted and/or saturated or unsaturated. In some embodiments, the linking group may include one or more amine groups. The amines, if any, may be present as constituents of the backbone of the linking group and/or may be present in groups that are pendant from the backbone. The linking group may include one or more other kinds of functionality that are substantially inert with respect to active amine functionality. Examples of such functionality include ether (such as pendant alkoxy and/or O in the backbone of the linking group), hydrocarbyl or hydrocarbylene, combinations of these, and the like.

The term "polyamine" means that a compound includes 2 or more amine groups per molecule on average. Amine functionality may be primary, secondary, and/or tertiary with the proviso that a Polycyclic Polyamine includes at least first and second tertiary amine groups and further includes on average greater than one, preferably greater than 1.5, more preferably at least 2 active amine groups per molecule. An active amine group refers to a primary or secondary amine having nitrogen atoms with one (primary) or two (secondary) H atoms pendant from the amine nitrogen. Preferred embodiments of a Polycyclic Polyamine include a combination of tertiary and secondary amines. Other embodiments of a Polycyclic Polyamine include a combination of tertiary, secondary, and primary amine moieties. Tertiary amine functionality advantageously provides catalytic functionality with respect to the reaction between active amine groups and epoxy functionality.

The term "polycyclic" means that a compound comprises a plurality of ring moieties. Polycyclic Polyamines may comprise cyclic moieties that comprise rings sharing only one atom (spino) or two or more atoms (fused or bridged)

Preferred ring moieties are aliphatic to provide better weathering for exterior applications. As one advantage, and without wishing to be bound by theory, it is believed that the polycyclic character of the Polycyclic Polyamine helps to impart flexibility, toughness, and resilience to the resultant cured compositions. Also, the polycyclic character of the Polycyclic Polyamine component helps to provide corrosion protection, improved adhesion, stain resistance, acid resistance, blush resistance, and resistance to yellowing. The Polycyclic Polyamine also may function as a plasticizer in the curable compositions. The Polycyclic Polyamine also has higher reactivity with respect to epoxy functionality as compared to compositions including only ethyleneamines such as triethylenetetramine (TETA), polyetherpolyamines, aromatic amines, cycloaliphatic amines, and the like. The Polycyclic Polyamines also have high amine equivalent weights (AEW) to achieve favorable epoxy-amine mixing ratios. This facilitates efficient mixing of the epoxy functional and amine functional materials, which in turn facilitates a wide range of coating or other application strategies such as high pressure airless spraying, high volume low pressure spraying, brushing, casting, curtain coating, spin coating, rolling, knife coating, molding, and/or the like. Further, coatings prepared from the compositions have excellent aesthetics, including excellent self-leveling properties with excellent resistance to defects such as blush, fish eye, orange peel, or the like when being cured at elevated temperature at least 180° C. Without wishing to be bound by theory, it is believed that the high boiling point and low VOC characteristics of the Polycyclic Polyamine contribute to the favorable aesthetics. Cured compositions also have excellent mechanical performance, include high tensile properties, high gouge resistance, and resistance to crazing or cracking in flexibility tests as compared to cured compositions obtained only from ethyleneamines (e.g., TETA) or polyether polyamines.

The polycyclic groups can include any combination of suitably sized ring groups. For example, the polycyclic groups may include any combination of cyclic groups having 4-atom rings, 5-atom rings, 6-atom rings, 7-atom rings, and/or 8-atom or higher rings. Preferred rings are 6 atom rings comprising 3 to 4 carbon atoms and 2 to 3 nitrogen atoms. More preferred rings are 6 atom rings including 4 carbon atoms and 2 nitrogen atoms in which the nitrogen atoms are in a para relationship (i.e, at the 1 and 4 positions of the ring).

Due to the properties and advantages of the present invention, the coating compositions and resultant cured compositions are especially useful as protective and/or structural coatings on metallic substrates such as the interior and/or exterior of steel or other metallic pipes used for oil and gas pipelines. Other metallic substrates that may be protected by the resultant coatings include industrial drums or other storage containers or tanks, reaction vessels, furniture, plumbing pipes, construction components, vehicle components, bridges or other roadway components, aircraft, marine vessels, docks, and the like. The coatings may also be used as protective coatings over underlying coatings such as fusion bonded coatings on metallic substrates or other primer or base coating(s). The coatings also may be used as protective coatings with other kinds of substrates such as wood, paper, plywood, fibreboard, chipboard, cardboard, paperboard, hardboard, ceramic, natural or synthetic fabrics, or the like. Protective coatings optionally may be reinforced with fibers or woven or non-woven cloths such as fiberglass, polyaramid, polyester, polyamide, acrylic resin, cellulosic fibers, combinations of these, or the like. The compositions also may be used as adhesives to bond materials together as described in M. Gougeon, *Gougeon Brothers on Boat Construction: Wood and West System Materials*, fifth edition, published October 2005, ISBN-10: 1878207504; ISBN-13: 978-1878207500.

In some embodiments, the curable admixtures in the form of coating compositions are derived from an epoxy functional component (Part A) comprising one or more epoxy functional ingredients and an amine functional component (Part B) comprising one or more amine functional ingredients, wherein the amine functional component comprises at least one Polycyclic Polyamine and the epoxy functional component comprises at least one epoxy functional ingredient including an average of at least 1.5 epoxy functional ingredients per molecule. Epoxy functionality and amine functionality are co-reactive even at room temperature. The rate of reaction between these functionalities tends to increase with increasing temperature. Accordingly, in some embodiments, the epoxy functional component and amine functional component may be prepared as a single admixture. In other modes of practice, it often is desirable to prepare and store/package Part A and Part B separately to prevent the ingredients from reacting too soon. Separately stored, Part A and Part B have long shelf life over a wide range of temperatures. Desirably, storage conditions are avoided under which one or more ingredients in either Part A or Part B may be susceptible to an undue risk of thermal degradation, degradation due to ultraviolet exposure, or other degradation. The two Parts may be combined and mixed thoroughly closer to the time of use and/or mixed as the Parts are applied. Optionally, in addition to epoxy functional ingredients and amine functional materials in Parts A and B, one or more other ingredients (described further below) may be included in Parts A and/or B. Alternatively, such other ingredients may be provided from other sources and incorporated into Parts A or B, or the admixture of A and B upon mixing. Upon mixing, the epoxy functionality and amine functionality co-react to form the resultant cured compositions.

Other curing functionality may be incorporated into the coating compositions, if desired, for a variety of purposes such as to enhance characteristics such as molecular weight build, crosslink density, toughness, hardness, and/or the like. The additional functionality may be included in one or more ingredients of Part A or Part B. Alternatively, if the additional functionality might be unduly co-reactive with one or more of the epoxy or amine functionality, such additional functionality may be incorporated into a separate Part, such as a Part C, or a Part C and Part D. For example, OH and NCO are examples of complementary functionalities that can be used for polymerization and/or crosslinking. NCO functionality also is co-reactive with amine functionality. Hence, NCO and OH functional materials desirably are prepared and stored separately from the amine functional ingredients and from each other until the time of use. Other examples of curing functionality include carboxylate-based moieties such as carboxylic acid, salts of carboxylic acid, carboxylic acid anhydrides, combinations of these, and the like. Such carboyxlate-based moieties are co-reactive with active amine, OH (if any), or the like.

For example, one or more ingredients in Part A and/or Part B may include free radically reactive functionality in addition to epoxy functionality (Part A) or amine functionality (Part B). Free radically reactive functionality is conveniently reacted by exposing the functionality to a suitable source of curing energy, often in the presence of agents (e.g., initiators, etc.) that help promote the desired reaction. The energy source used for achieving polymerization and/or crosslinking of the functionality may be actinic (e.g., radiation having a wavelength in the ultraviolet or visible region of the spectrum), accelerated particles (e.g., electron beam radiation), thermal (e.g., heat or infrared radiation), combinations of these, or the like. Representative examples of free radically polymerizable functionality include (meth)acrylate groups, olefinic carbon-carbon double bonds, allyloxy groups, alpha-methyl styrene groups, (meth)acrylamide groups, cyanate ester groups, (meth)acrylonitrile groups, vinyl ethers groups, combinations of these, and the like. The term "(meth)acryl", as used herein, encompasses acryl and/or methacryl unless otherwise expressly stated.

In some modes of practice, a Polycyclic Polyamine has the formula (Formula A)

wherein:
- (a) the A group is a linking group;
- (b) each Q independently is H, a monovalent moiety, or a co-member of a ring structure with another Q; more preferably Q is H or a hydrocarbyl or alkoxy moiety of 1 to 8 carbon atoms; and
- (c) each Z independently is H or a monovalent moiety optionally incorporating one or more heteroatoms and/ or substituents that comprise amine functionality or are substantially inert with respect to amine functionality; with the proviso that one or more of A, Z, and/or Q are selected such that the Polycyclic Polyamine comprises on average greater than 1, preferably greater than 1.5, more preferably 2 or more active amine moieties per molecule.

Any of Z, Q, or A independently may optionally include one or more backbone hetero atoms and/or may be linear, branched, or cyclic; saturated or unsaturated; substituted and/or unsubstituted; and/or aliphatic or aromatic. Aliphatic embodiments are desired for exterior applications.

In many preferred modes of practice, a Polycyclic Polyamine has the formula (formula 1)

wherein:
- (d) each X is independently a divalent linking group, preferably a divalent hydrocarbyl moiety of 1 to 20, preferably 1 to 10, more preferably 1 to 4 carbon atoms, optionally incorporating one or more heteroatoms and/ or substituents that comprise amine functionality or are substantially inert with respect to amine functionality;
- (e) each Q and Z independently is as defined above;
- (f) R is H, a monovalent moiety optionally incorporating one or more heteroatoms and/or substituents that are comprise amine functionality or are substantially inert with respect to amine functionality; or has the formula (formula 2)

wherein Y is a single bond or a divalent linking group having the same definition as X, and each Q and Z independently is as defined above. Any of Z, Q, X, and/or Y may be linear, branched, or cyclic; saturated or unsaturated; and/or aliphatic or aromatic. Aliphatic embodiments are desired for exterior applications. Further, one or more of X, R, Z, and/or Q are selected so that the Polycyclic Polyamine comprises on average greater than 1, preferably greater than 1.5, more preferably 2 or more active amine moieties per molecule.

In some preferred modes of practice, the Polycyclic Polyamine has a formulae according to one or more of (formulae 3, 4, 5 and 6, respectively):

wherein each X independently is a divalent hydrocarbyl moiety of 1 to 8 carbon atoms, preferably 1 to 4 carbon atoms, more preferably 2 carbon atoms; each Z is independently H, or a monovalent moiety such as one comprising 1 to 50, preferably 1 to 25 carbon atoms and optionally additional functionality such as amine functionality, ether functionality, or the like, wherein at least one Z may be H. In some embodiments where greater compatibility with water is desired, Z may be polyether moieties comprising a plurality of repeating oxyalkylene units (e.g., —CH$_2$CH$_2$O—, —CH$_2$CH(CH$_3$)O—, —CH(CH$_3$)CH$_2$O—, —CH$_2$CH(CH$_2$CH$_3$)O—, and —CH(CH$_2$CH$_3$)CH$_2$O). In some embodiments where hydrophobic properties are more desirable such as to provide water resistance, each Z may be a hydrophobic moiety optionally including at least 6 carbon atoms and further optionally including amine functionality.

In other embodiments, a Polycyclic Polyamine has Formula I and/or II:

wherein each R, T, U, V, W, X, Y, and Z group, in Formula I and II above, is the same or different and is selected from hydrogen, or a hydrocarbyl group; and the value of x is 0 to 10, with the proviso that if x is greater than 1, each T may be the same or different. Preferably, R, T, U, V, W, X, Y and Z are H or straight, branched, or cyclic hydrocarbyl such as alkyl of 1 to 10 carbon atoms, preferably 1 to 3 carbon atoms. More preferably, R, T, U, V, W, X, Y and Z are H. The values of x in the above chemical formulae and the practice of the present invention are typically in the range of from 0 to 10 in one embodiment, in the range of from 2 to 5 in another embodiment, in the range of from 2 to 3 in still another embodiment, and 0 or 1 in yet another embodiment.

Hydrocarbyl groups that may be used in the practice of the invention may be substituted or unsubstituted, linear, branched, or cyclic hydrocarbyl such as alkyl, aryl, aralkyl, or the like; a monovalent moiety including one or more heteroatoms; polyether chains comprising one or more oxyalkylene repeating units such as —$R^1$O—, wherein $R^1$ is often alkylene of 2 to 5 carbon atoms; other oligomeric or polymer chains of at least 2 repeating units.

Representative examples of Polycyclic Polyamines according to Formula I useful in the present invention include bis(2-(piperazin-1-yl)ethyl)amine (BPEA), bis(3-(piperazin-1-yl)propyl)amine, bis(4-(piperazin-1-yl)butyl)amine, bis(5-(piperazin-1-yl)pentyl)amine, bis(6-(piperazin-1-yl)hexyl)amine, bis(1-(piperazin-1-yl)propan-2-yl)amine, bis(2-(piperazin-1-yl)propyl)amine, and mixtures thereof. Examples of Polycyclic Polyamines according to Formula II that are useful in the present invention include 2-(4-(2-(piperazin-1-yl)ethyl)piperazin-1-yl)ethanamine, 3-(4-(3-(piperazin-1-yl)propyl)piperazin-1-yl)propan-1-amine, 4-(4-(4-(piperazin-1-yl)butyl)piperazin-1-yl)butan-1-amine, 5-(4-(5-(piperazin-1-yl)pentyl)piperazin-1-yl)pentan-1-amine, 6-(4-(6-(piperazin-1-yl)hexyl)piperazin-1-yl)hexan-1-amine, 1-(4-(1-(piperazin-1-yl)propan-2-yl)piperazin-1-yl)propan-2-amine, 2-(4-(2-(piperazin-1-yl)propyl)piperazin-1-yl)propan-1-amine, and mixtures thereof. Mixtures of one or more compounds according to Formula I and one or more compounds according to Formula II also may be used.

Oligomers or polymers incorporating one or more Polycyclic Polyamines also may be used. An oligomer refers to a compound incorporating from two to ten repeating units. A polymer refers to a compound incorporating 11 or more repeating units. Repeating units typically are derived from one or more monomers. A monomer generally includes at least one polymerizable moiety and generally constitutes a single repeating block when incorporated into an oligomer or polymer. Monomers may be incorporated into oligomers or polymers via co-polymerization with itself or with one or more other kinds of monomers, oligomers, and/or polymers. Non-polymerizable terminal moieties, e.g., a monoalcohol or alkoxy group, are not considered repeating units for purposes of the present invention. The repeating units incorporated into oligomers and/or polymers may be the same or different. Unless otherwise expressly indicated, the terms "homo-oligomer" or "homopolymer" refer to compounds incorporating one kind of repeating unit. The terms "co-oligomer" and "copolymer" refer to compounds incorporating two or more different kinds of repeating units. The term "oligomer" encompasses both homo-oligomers and co-oligomers. The term "polymer" encompasses both homopolymers and copolymers.

The molecular weight of the Polycyclic Polyamine useful the present invention may range generally from about 200 g/mol to about 10,000 g/mol in one embodiment, and from about 240 g/mol to about 2,000 g/mol in another embodiment. As used herein, the term molecular weight refers to the number average molecular weight unless otherwise noted. In many instances, a material such as a polymer or oligomer may be present as a population distribution in which the actual molecular weight of individual molecules varies within the population. The number average molecular weight provides a statistical way to describe the molecular weight of the population as a weighted average of the actual molecular weights of individual molecules. In other instances, such as for smaller monomers, the material might be present predominantly in a single molecular form. In such instances, the actual molecular weight of individual molecules is substantially identical among the population so that the atomic weight and the number average molecular weight of the population are the same. Molecular weight parameters may be determined using any suitable procedures. According to one approach, molecular weight features are determined using size exclusion chromatography.

A particularly preferred embodiment of a Polycyclic Polyamine is bis(2-(piperazine-1-yl)ethyl)amine (BPEA), having the formula (Formula 7):

Polycyclic Polyamines may be prepared using a wide range of synthesis strategies or may be obtained from commercial sources. Synthesis strategies incorporating reductive amination techniques are described for instance in commonly assigned U.S. Provisional Patent Application Ser. No. 61/581,323, titled FORMATION OF HIGHER MOLECULAR WEIGHT CYCLIC POLYAMINE COMPOUNDS FROM CYCLIC POLYAMINE COMPOUNDS filed Dec. 29, 2011, in the name of Stephen King, which application is incorporated herein by reference for all purposes. U.S. 61/581,323 describes processes of transaminating cyclic polyamine compounds described therein in the presence of a catalyst under conditions effective to cause the formation of Polycyclic Polyamines. Suitable catalysts for the transamination may include, for instance, nickel (Ni), copper (Cu), cobalt (Co), ruthenium (Ru), rhenium (Re), rhodium (Rh), platinum (Pt), palladium (Pd), iridium, or combinations thereof. A preferred catalyst may comprise Ni and Re in a ratio in the range of 3:1 to 14:1 on an alumina-silica support. The process may be carried out, for example, at elevated pressure, e.g., 300-1000 psi, and at elevated temperature, e.g., 100-220° C. in the presence of hydrogen at a level of, for example, from 0.1 to 100 mole percent of the reaction mixture. The cyclic polyamines contained in the reaction product mixture may be separated (refined) by any method known in the art, for example, using conventional distillation technology, including dividing wall columns. Other separation techniques such as membrane separation, melt crystallization, and reactive distillation may also be employed.

Other techniques for making Polycyclic Polyamines are described in commonly assigned U.S. Provisional Patent Application Ser. No. 61/717,901, titled AMINE POLYETHER POLYOLS AND POLYURETHANE FOAM COMPOSITIONS MADE FROM CYCLIC AMINE COMPOUNDS, naming inventors including Stephen King, Jean-Paul Masy, and Esther Quintanilla, filed Oct. 24, 2012, subsequently published as U.S. Publication. No. 2014/0357750; and in commonly assigned U.S. Provisional Patent Application Ser. No. 61/717,913, titled CYCLIC AMINE COMPOUNDS, COMPOSITIONS, AND POLYURETHANE FOAMS MADE THEREFROM, naming inventors including Stephen King, Dwight Latham, Phil Athey, filed Oct. 24, 2014, subsequently published as U.S. Publication. No. 2015/0005404.

In an illustrative mode of practice, these techniques are used to synthesize bis(2-(piperazin-1-yl)ethyl)amine (BPEA). A fixed bed plug flow reactor is packed with a Ni (6.8 wt. percent)/Re (1.8 wt. percent) loaded alumina (80 wt. percent)-silica (20 wt. percent) catalyst. 2-(piperazin-1-yl) ethanamine (AEP) and hydrogen (1.0-1.5 mole percent based on AEP feed) are fed to the reactor at 800 psig and temperatures of 140-165° C. The crude reaction mixture is distilled to give ≥95 percent (area percent by gas chromatography) bis(2-(piperazin-1-yl)ethyl)amine (BPEA). The material is also analyzed by electrospray ionization liquid chromatography mass spectrometry (ESI-LC-MS). The positive ion mass spectrum shows a peak at 242.2.

One or more Polycyclic Polyamines may constitute all or any portion of the amine functional ingredients included in the amine functional component. Optionally, one or more other kinds of amines may also be included in the amine functional component as well. If other amines are included, these may be included in the amine functional component in any amount. For example, some embodiments of the amine functional component may include from 0.01 to 99.9, even from 1 to 90, or even from 10 to 95 weight percent of the other amines based on the total weight of the other amines and the Polycyclic Polyamine(s) included in the component. In illustrative embodiments, amine functional components including from 1 to 40 parts by weight of one or more additional amines per 10 parts by weight of Polycyclic Polyamines would be suitable. The additional amines may be linear, branched, or cyclic; saturated or unsaturated; and/or aliphatic or aromatic. In addition to amine functionality, the additional amines optionally may include one or more additional kinds of functionality such as OH, ether, amide, combinations of these, or the like. Additional amines may include primary, secondary, and/or tertiary amine functionality.

A wide range of additional amines would be suitable. Examples include aminoethyl piperazine (AEP), linear triethylenetetraamine (L-TETA), trisaminoethylamine (TAEA), tetraethylenepentamine (TEPA), pentaethylenehexamine (PEHA), ethylenediamine (EDA), N-(piperazinoethyl)ethylenediamine (PEEDA), linear tetraethylenepentamine (L-TEPA), piperazine (PIP), diethylenetriamine (DETA), isophorone diamine (IPDA), polyetherpolyamines such as those available under the trade designation "JEFFAMINE" from Huntsman, or those formed by reacting a polyamine with epoxy functional materials under conditions such that the products are amine functional adducts, combinations of these, and the like.

Cured compositions of the present invention may be used in environments in which the cured compositions are exposed to water, water vapor, steam, high humidity, or the like. Some embodiments of Polycyclic Polyamines may be unduly hygroscopic in these environments, causing the cured compositions to be too permeable to water or water vapor. Water permeation may intensify in the presence of hygroscopic reactive diluents such as 1,4 butanediol diglycidyl ether (BDDGE). One way to overcome such susceptibility to water permeation is to use blends of the Polycyclic Polyamine with one or more other amines (or reactive diluents on the Part A side) that are more hydrophobic than the Polycyclic Polyamine. Hence, using amine functional components that comprise blends of one or more Polycyclic Polyamines and one or more amines that render the resultant cured material less hygroscopic may be desirable in these applications.

The epoxy functional component comprises one or more epoxy functional compounds, monomers, and/or resins, wherein at least one epoxy functional ingredient (polyfunctional with respect to epoxy functionality) comprises at least one epoxy functional ingredient including an average of at least 1.5 epoxy functional ingredients per molecule. In addition to at least one ingredient that is polyfunctional with respect to epoxy functionality, the epoxy functional component may optionally include one or more compounds that have on average less than 1.5 epoxy groups per molecule if desired. For instance, a coating composition of the present invention may optionally include one or more compounds that are monofunctional with respect to epoxy functionality.

In many modes of practice, the epoxy functional component optionally includes one or more reactive diluent comprising epoxy polyfunctionality and at least one epoxy polyfunctional resin having a molecular weight greater than 500, preferably greater than 1000. Preferred epoxy polyfunctional resins have a molecular weight less than 20,000, preferably less than 10,000. Optionally, the reactive diluent(s) and/or resin(s) may further include one or more ingredients that have on average less than 1.5 epoxy groups per molecule. For example, materials that are monofunctional with respect to epoxy may be used if desired in addition to the polyfunctional materials.

The reactive diluent(s) are present in a sufficient quantity relative to the epoxy functional resin(s) so that the epoxy functional component has desired viscosity and/or other characteristics. In many embodiments, using a weight ratio of reactive diluent(s) to epoxy functional resin(s) in the range from 1:20 to 20:1, preferably 1:5 to 5:1 would be suitable. The epoxy functional reactive diluents and/or resins may be linear, branched, cyclic; saturated or unsaturated; and/or aliphatic or aromatic.

A reactive diluent in this context refers to at least one epoxy functional compound, including resin(s), having a molecular weight of 500 or less. Preferred epoxy functional reactive diluents are liquids at 20° C. and 1 atm. In the uncured coating composition, the reactive diluent serves as a solvent, or diluent for other components of the composition but then polymerizes and/or crosslinks to become part of the cured matrix of the resultant cured compositions. In some embodiments, the reactive diluent comprises at least one ingredient that is polyfunctional with respect to epoxy functionality.

Exemplary reactive diluents of this type include mono, di, tri, tetra, penta, and/or hexa glycidyl ethers of one or more polyols. Preferred reactive diluents are di or triglycidyl ethers of diols and/or triols. More preferred reactive diluents are diglycidyl ethers of diols. Optionally, the reactive diluent additionally may include ingredients that are monofunctional with respect to epoxy functionality. Exemplary epoxy functional diluents include 1,4-butanediol diglycidyl ether (BDDGE), glycidyl isopropyl ether (PGE), bisphenol A diglycidyl ether (BADGE), isophorone oxide, cyclohexanedimethanol diglycidylether (CHDM DOE), methyl-1-2-cyclopentene oxide, 2-methyl-2-vinyloxirane, 4,4'-methylenebis(N,N-diglycidylaniline), neopentyl glycol diglycidyl ether, octyl diglycidyl ether, decyl diglycidyl ether, 1,6-hexane diol diglycidyl ether, alpha-pinene oxide, propylene oxide, resorcinol diglycidyl ether, cis-stilbene oxide, styrene oxide, 1,2,7,8-Diepoxyoctane, Diglycidyl 1,2-cyclohexanedicarboxylate, N,N-Diglycidyl-4-glycidyloxyaniline, 1,2-Epoxybutane, cis-2,3-Epoxybutane, 3,4-Epoxy-1-butene, 1,2-Epoxydodecane, 1,2-Epoxyhexane, exo-2,3-Epoxynorbornane, 1,2-Epoxy-3-phenoxypropane, exo-3,6-Epoxy-1,2,3,6-tetrahydrophthalic anhydride, 2-Ethylhexyl glycidyl ether, Furfuryl glycidyl ether, Glycerol diglycidyl ether, Glycidyl hexadecyl ether, diglycidylhydantoin, triglycidyl isocyanarate, combinations of these, and the like.

A wide range of epoxy functional resins with molecular weights greater than 500 may be used in combination with the reactive diluent. In some modes of practice, such epoxy resins are polyfunctional materials that include on average at least 1.5, preferably at least 1.8, more preferably at least 2 epoxy groups per molecule. In addition to such polyfunctional materials, optionally one or more resins having an average epoxy functionality of less than 1.5 also may be used. The average epoxy equivalent weight (EEW) is preferably no more than about 250, preferably no more than about 190 g/mol in some embodiments. The EEW preferably is at least 70, more preferably at least 100 g/mol. Epoxy functional resins with molecular weights greater than 500 may be liquids or solids at 20° C. and 1 atm. Resultant admixtures of such resins and at least one reactive diluent often form single phase, liquid mixtures at 20° C. and 1 atm.

In some modes of practice, at least one epoxy resin is a digylcidyl ether of a diol or a triglycidyl ether of a triol, wherein the diol or triol has a molecular weight sufficiently high such that the resultant ether has a molecular weight greater than 500. Exemplary epoxy resins of this type characterized by low viscosity characteristics are further described in U.S. Pat. No. 7,579,392. In other modes of practice, at least one epoxy resin is an epoxy novolac resin (also referred to as epoxidized novolac resins) including epoxy phenol novolac resins and epoxy cresol novolac resins. Such epoxy resins are further described in U.S. Pat. No. 6,353,080. Each of these U.S. patents is incorporated herein by reference in its respective entirety for all purposes.

The relative amounts of the amine functional component and the epoxy functional component may vary over a wide range. Either component may be in excess, if desired. An excess of amine functionality provides a cured matrix with amine functionality, while an excess of epoxy functionality provides a cured matrix with epoxy functionality. In many embodiments, the components are formulated so that the amine functionality is in a moderate excess, e.g., a stoichiometric excess of 1% to 20%.

In addition to the epoxy and amine functional components, coating compositions may include one or more optional ingredients if desired. Suitable optional additives include, for example, those that improve the processability or manufacturability of the composition, enhance composition aesthetics, or improve a particular functional property or characteristic of the coating composition or the resultant cured compositions, such as adhesion to a substrate or adjacent composition. Additives that may be included are one or more carriers, catalysts, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, pigments, colorants, waxes, anti-oxidants, anticorrosion agents, flow control agents, thixotropic agents, flow control agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom.

The coating compositions of the present invention may be prepared in various ways. The coating compositions may be prepared and applied as a solvent-free powder coating, as a substantially solvent-free hot melt coating, as a substantially solvent-free liquid admixture, or the resins may be reduced in viscosity by dilution with one or more solvents and applied as a liquid admixture. For example, the coating compositions may be prepared by simply admixing the ingredients in any desired order with sufficient mixing. The resulting mixture may be admixed until all the composition ingredients are substantially homogeneously blended. If the coating composition is to be prepared as two or more separate parts (such as Part A and Part B described above), the ingredients of the individual parts are combined and mixed. The parts may then be combined and mixed at the time of use. Mixing equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

The coating compositions of the invention can be applied to a substrate using any suitable procedure such as spray coating, roll coating, coil coating, curtain coating, immersion coating, meniscus coating, kiss coating, blade coating, knife coating, dip coating, slot coating, slide coating, brushing, casting, spin coating, injection molding, or the like, as well as other types of pre-metered coating. The present coating compositions can be used to produce cured films having a thickness from 3 mils to 200 mils, preferably 5 mils to 40 mils, more preferably 15 mils to 30 mils. Desirably, the time period between mixing and coating is short enough to avoid undue gelling or other curing progress that may make coating more difficult. In many embodiments, coating may immediately follow mixing (such as if the Part A and Part B were to be mixed within or external to a spray nozzle, or there may be some After applying the coating composition onto a substrate, the composition can be cured using a variety of processes, including, for example, oven baking by either conventional or convectional methods. In preferred embodiments, the coating composition of the present invention is a thermal-cure coating composition. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the invention is a heat-curable coating composition.

The curing process may be performed at any suitable temperature, including, for example, oven temperatures in the range of about 50° C. to about 250° C. for a time period in the range from 10 seconds to 48 hours. The upper end of suitable curing temperature, however, can change depending on the decomposition temperature of the ingredients used in a particular embodiment. In one embodiment, coatings are cured at 180° C. for 3 minutes.

The coating compositions of the present invention are particularly useful in multilayer coating systems that are used to protect metallic, oil and gas pipelines against corrosion. The coating system defends against pipeline corrosion at least in part by limiting oxygen permeation. This protection often is used in combination with cathodic protection that also helps to protect against corrosion. The coatings also enhance the ability of the protected pipes to withstand damage during storage, handling, installation, maintenance, service, exposure to the elements, and the like.

Figure 1:
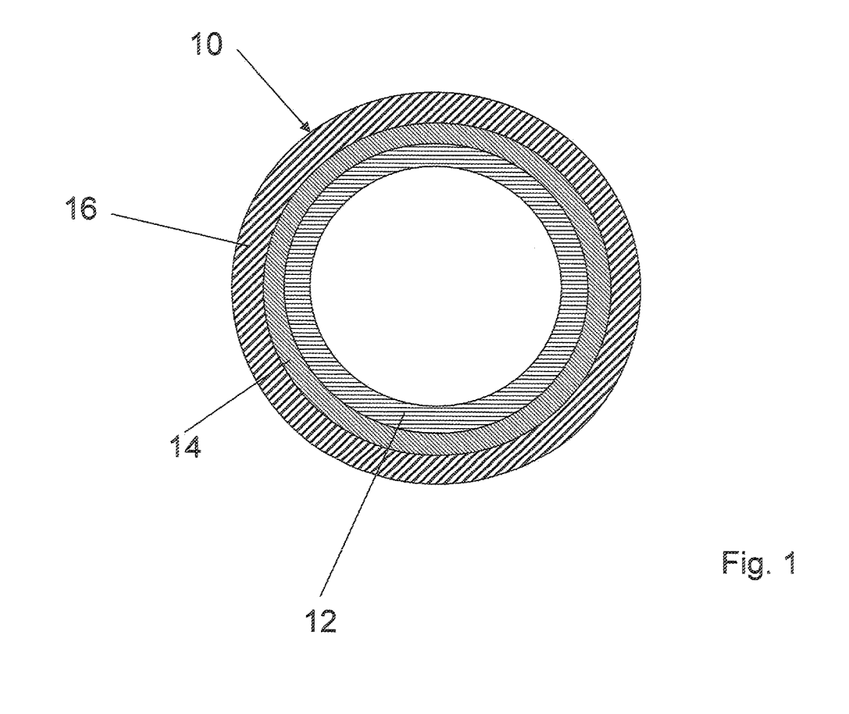
FIG. 1 schematically illustrates a cross section of a pipeline protected by a coating system of the present invention.

FIG. 1 schematically shows an exemplary coating system 10 of the present invention used to protect the exterior of pipe 12. Coating system 10 includes base coat 14 and top coat 16. Base coat 14 is a coating derived from ingredients including epoxy functional powder(s). In addition to one or more epoxy functional materials, the ingredients used to form base coat 14 may include one or more epoxy hardeners such as OH and/or amine functional materials. The powder(s) are electrostatically sprayed onto the pipe surface. The pipe surface is heated, such as to a temperature in the range of 220° C. to 240° C. to melt, fuse, and cure the powders. The resultant coating is referred to as a fusion bonded epoxy (FBE) coating. FBE base coatings have been an industry standard for protection oil and gas pipelines against corrosion for more than 40 years. Top coat 16 may be applied onto base coat 14 wet on wet or wet on dry. Top coat 16 is derived at least in part from a coating composition of the present invention described above. In use, Part A and B are dispensed through one or more suitable nozzles and then sprayed onto the base coat 14. Parts A and B may be mixed before being dispenses from the nozzle(s) and/or can be mixed external to the nozzle such as by impacting the dispensed streams.

Preferred modes of practice involve applying the coating composition corresponding to top coat 16 while base coat 14 is still in a liquid or partially liquid state. Such "wet on wet" coating advantageously allows the top coat 16 and base coat 14 to chemically bond to each other for enhanced adhesion.

After being sprayed or otherwise applied, the sprayed precursor of top coat 16 is cured under conditions suitable to convert the coating composition into the cured top coat 16. In an exemplary mode of practice, curing occurs at 180° C. for 3 minutes, after which the coated pipe may be cooled such as by quenching with water. The thickness of the cured base coat 14 often is 10 mil to 15 mil. The thickness of the top coat 16 often is 3 mils to 200 mils, preferably 5 mils to 40 mils, more preferably 15 mils t 30 mils.

The present invention will now be further described with respect to the following illustrative examples. In the examples, the following procedures are used:

Coating Preparation

3"×8"×11 GA cold rolled steel panels and 1"×8"×⅜" steel bars were preheated in an air convection oven at 180° C. for 30 min and placed on a magnetic plate operating with an on/off lever in a fume hood. Coating formulations were prepared by mixing all the ingredients of the coating composition in a single batch (no separate Part A and B) in 100 g max standard plastic containers using a FlackTek Speed Mixer at 800 rpm for 30 sec, followed by 2350 rpm for 1 min. Homogeneous mixtures were dispensed and manually drawn using a doctor blade with 50 mil clearance on the preheated substrates. The coated panels were then placed in the oven and cured for 3 min before being quenched in cooling water. Dry film thickness (DFT) of cured coatings was measured using a Fischerscope multi measuring system.

Coatings for the Gouge test were prepared in a slightly different way. The mixture after speed mixing was poured into a 1 mm thick mold window placed on two aligned 3"×4"×11 GA steel panels and cured at 180 C for 3 min prior to water quenching.

Plaque Preparation

Plaques for microtensile measurement were prepared by casting the mixture from the speed mixer on the 6" circular metal lids treated with silicone mold release, followed by heat cure at 180° C. for 3 min. The cured plaques were fabricated into 4.7 mm×21.0 mm "dog bone" bars using the Indusco hydraulic swing arm cutting machine.

Viscosity Measurement

Viscosity of the mixture of the formulation was measured using a stress-controlled AR2000 rheometer (TA Instruments). After speed mixing, 6-7 g of the air-free mixture was dispensed on the heated circular stage at 60° C. and carefully covered with a 50 mm upper parallel plate to achieve a gap of 800 μm. 10 sec pre-shearing at 10 s$^{-1}$ followed by 20 sec equilibration was performed prior to sampling. The viscosity data was collected at a steady shear of 1 s$^{-1}$ every 30 sec.

Microtensile

The tensile properties of the plaques were measured in accordance with ASTM D1708 by stretching 4.7 mm×21.0 mm microtensile "dog bone" bars at a constant crosshead speed of 5 in/min using a MTS 500/S Insight Universal Test System with ReNew™ Upgrade Package. The pressure of pneumatic grips was fixed to 20 psi. The sample thickness was measured using a Mitutoyo micrometer.

Differential Scanning Calorimetry (DSC)

Approximately 5 to 6 mg of cured samples of were loaded in standard aluminum pans. After sealed with lids, the crucibles were placed in an auto sampler on TA instruments DSC Q200. The samples were programmed to be cooled to −80° C., ramped to 200° C. at a rate of 10° C./min, equilibrated at −80° C. again, and ramped to 200° C. at a rate of 10° C./min again.

Water Absorption Test

Three microtensile bars were immersed in tap water and heated at 75° C. for 48 hours. The wet specimens were lightly patted dry using a paper towel and weighed in a balance to estimate % change in weight. Within 30 min of removal the tensile strength and elongation of the wet plaques were measured in accordance with ASTM D1708.

CSA Standard Tests (Z245.20-10):

7° PPD Flexibility Test

Coated steel bars were placed in the Thermo Scientific Revco™ Ultra-low Temperature Chest Freezer and cooled at −32° C. for 4 hours prior to testing. The cooled bar was mounted between four pins installed in Instron 4505. Two pins were attached to the upper block that supports the specimen from the top and two pins were positioned on the lower block installed on the hydraulic piston that pushes the bar upward by 1 inch. The distance between the pins was 6 inch in the upper block and 2 inch in the lower block, respectively. 1 inch displacement actually corresponds to 7° bending per pipe diameter length. The deformed specimens were warmed to ambient temperature over a course of an hour. After condensed moisture was removed from the coating surface, the specimens were visually inspected for cracks.

Gouge Resistance

The shear scratch resistance test is often referred to as the "gouge" test. The test was conducted at Partech by moving the coated panel fixed on a translational stage at a constant speed under a weighted probe. Loading was fixed to 30 kg and a smooth bit (SL-1) was chosen to generate the scratch on the coating surface. Three points were marked on each scratch to measure the depth of gouge.

Examples 1-3: Physical Properties and Cure Kinetics

Figure 2:
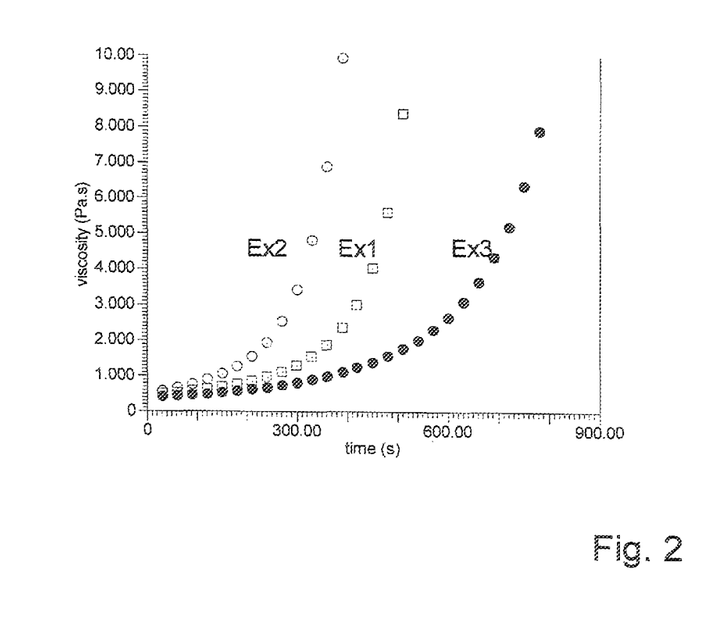
FIG. 2 is a graph comparing viscosity buildup of curable compositions including two compositions of the present invention and a comparison example.

Three formulations (Ex1 to Ex3) were prepared according to the chart shown in Table 1 to investigate the effect of the amine hardener on the physical properties of the cured plaques and the cure speed of the formulation. As seen in Table 2, BPEA (Ex 2) improved the toughness of the plaque by increasing both tensile strength and ultimate elongation up to 50% compared to triethylenetetramine (TETA, Ex 1), yet glass transition temperature (Tg) is reduced by 8° C. A 50:50 blend of BPEA and Jeffamine T403 with the same AEW resulted in not only a reduction in tensile strength to the level of the TETA cured plaque, but also a drop of $T_g$ to 35° C. Also, FIG. 2 shows the overall cure kinetics are accelerated with BPEA compared to TETA whereas Jeffamine T403 significantly slowed down the reaction. The time for the formulation viscosity to reach 1 Pa·s at 80° C. was 150 s with BPEA, 250 s with TETA, and 370 s with a blend of BPEA and Jeffamine T403, respectively.

TABLE 1

The formulation chart

| | EW (g/mol) | Ex1 | Ex2 | Ex3 |
|---|---|---|---|---|
| BDDGE reactive diluent | 130 | 16.1 | 16.1 | 16.1 |
| JeffamineT5000 polyether polyamine | 952 | 10.3 | 10.3 | 10.3 |
| Dow Neptune ™ resin (epoxy functional) | 460 | 67.8 | 67.8 | 67.8 |
| D.E.R. 383 Epoxy resin | 180 | 5.8 | 5.8 | 5.8 |
| TETA | 24 | 7.0 | | |
| BPEA | 80 | | 23.4 | 11.7 |
| JeffamineT403 polyether polyamine | 80 | | | 11.7 |

The epoxy functional, Dow Neptune™ resin included in Table 1 comprises a polypropylene oxide backbone that phase separates from at least the other epoxy functional ingredients as the formulation cures. This phase separation tends to occur from an initially homogeneous admixture including the uncured epoxy functional and amine functional ingredients. The phase separation promotes impact resistance, flexibility, and toughness. In practical effect, the resin cures so that at least portions of the cured material corresponding to the resin phase separate into separate domains. These domains function from one perspective like toughening rubber particles except that the toughening domains are crosslinked into the resultant cured matrix for integral toughening. One or more toughening ingredients such as this are optionally but beneficially incorporated into many formulation embodiments of the present invention. Epoxy functional tougheners may comprise from 1 to 500 parts by weight of the formulation per 10 to 100 parts by weight of other epoxy functional ingredients.

TABLE 2

Properties of the plaques cured with the Dow Neptune ™ resin and amine hardeners

| | Ex1 | Ex2 | Ex3 |
|---|---|---|---|
| Tensile strength (MPa) | 9.7 | 15.5 | 10.6 |
| Elongation (%) | 51 | 92 | 94 |
| Modulus (MPa) | 105 | 333 | 164 |
| $T_g$ (° C., DSC) | 55 | 47 | 35 |
| Time to reach 1 Pa · s at 80° C. | 250 | 150 | 370 |

7° PPD Flexibility Test:

The formulation of Ex2 was applied to steel bars to conduct 1" displacement bar bending test at −32° C. The coating deformed nicely without creating cracks or disbondment from the metal surface.

Ex4-Ex9: Coating Aesthetics

Table 3 lists the composition of binary mixtures of the Dow Neptune™ resin and amine curatives with boiling points (B.P.) higher than 180° C. These formulations were used to prepare three replicas of 20-30 mil thick coatings directly cured on the steel panels at 180° C. for 3 min. The coating surface was evaluated between 1 (best) and 5 (worst) based on the visual inspection. The results are summarized at the bottom of Table 3 and actual photographs of those coatings are also included in FIG. 3. Surface smoothness can be inferred by the light reflection on the coating surface. There was a great deal of variation in the appearance of the coatings depending upon the type of hardener. It was observed that the surface smoothness was equally affected by both B.P. (or vapor pressure) and the reactivity of the hardener at cure temperature. Overall BPEA and TETA produced the smoothest surfaces among all hardeners chosen in examples. Interestingly, the coating cured with AEP was ranked $4^t$ despite the similarity of chemical structure and the comparable reactivity to BPEA.

TABLE 3

The formulation chart used for coating aesthetics and surface smoothness (1 best 5 worst)

| | B.P. (° C.) | EW (g/mol) | Ex 4 | Ex 5 | Ex 6 | Ex 7 | Ex 8 | Ex 9 |
|---|---|---|---|---|---|---|---|---|
| Dow Neptune ™ epoxy functional resin | | 460 | 100 | 100 | 100 | 100 | 100 | 100 |
| TETA | 260 | 24 | 5.2 | | | | | |
| BPEA | >320 | 80 | | 17.4 | | | | |
| Meta-xylylene diamine (mXDA) | 273 | 34 | | | 7.4 | | | |
| Dow epoxy hardener (D.E.H. 58 ™) | 207 | 30 | | | | 6.5 | | |
| AEP | 222 | 43 | | | | | 9.4 | |
| Isophorone diamine (IPDA) | 247 | 42.6 | | | | | | 9.3 |
| Surface Smoothness (1 best 5 worst) | | | 1 | 1 | 2 | 3 | 4 | 5 |

Figure 3:
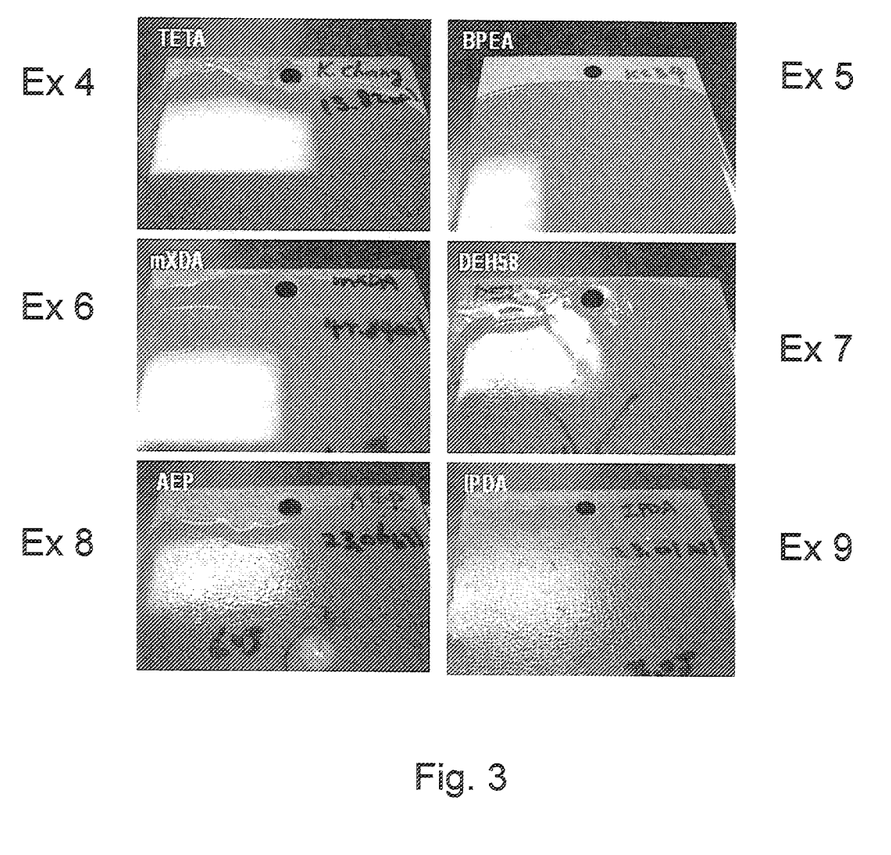
FIG. 3 includes photographs comparing the visual and surface quality of a coating of the present invention to comparison coatings.

The photographs in FIG. 3 show the visual quality of the films prepared from Examples 4-9.

Ex10-Ex11: Gouge Test Results

Table 4 compares gouge resistance of two coating specimens cured with either TETA or a 50:50 mixture of TETA and BPEA. A total of 30 kg loading was imparted on a SL-1 smooth bit. As a result, the depth of gouge was reduced from 36 mil to 16 mil when BPEA was mixed with TETA. As previously shown in Table 2, the addition of BPEA increased the modulus of the coating, which in turn improved the gouge resistance.

TABLE 4

Gouge resistance of coatings

| | EW (g/mol) | Ex10 (g) | Ex11 (g) |
|---|---|---|---|
| BDDGE | 130 | 10.0 | 10.0 |
| JeffamineT5000 | 952 | 10.0 | 10.0 |
| Dow Neptune ™ resin | 460 | 30.0 | 30.0 |
| D.E.R.383 | 180 | 50.0 | 50.0 |
| TETA | 24 | 9.8 | 7.5 |
| BPEA | 80 | | 7.75 |
| Depth of Gouge(mil) @ 30 kg | | 36 | 16 |
| Tg (° C.) | | 97 | 94 |

Example 12: Water Absorption Properties

Figure 4A:
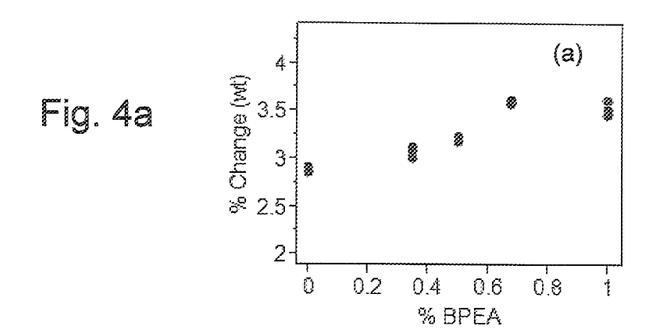
FIGS. 4a, 4b, and 4c are graphs showing how the amine hardener composition affects water absorption of cured coatings in terms of weight change, tensile strength characteristics, and modulus characteristics.
Figure 4B:
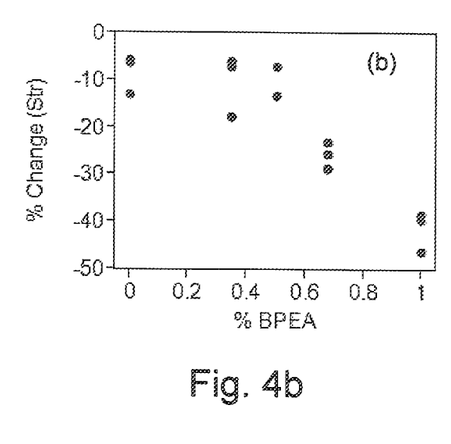
Figure 4C:
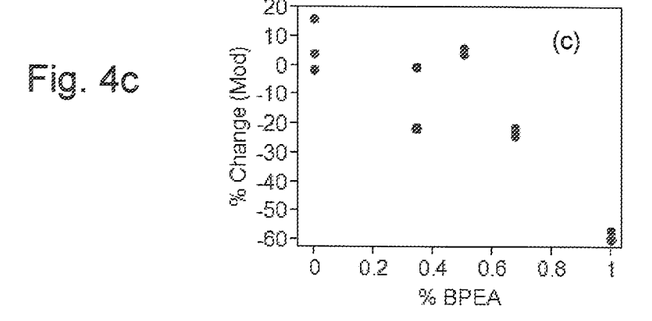

It has been observed that BPEA tends to increase the hydrophilicity of the coating. One way to address this problem is to mix BPEA with other amine curatives that are less sensitive to water permeation when being cured with epoxy. Ex4, Ex5, and the mixture thereof were used to further investigate the effect of BPEA on water swelling. The proportions of the two examples was gradually varied so that the amount of BPEA relative to total amount of BPEA and TETA ranged from 0% to 100% FIG. 4 illustrates the % change in weight and tensile properties of the plaques cured with variable combinations of TETA and BPEA before and after water immersion testing. Water absorption in the plaque continuously increased from 2.8% to 3.7% as the amount of BPEA increased in the amine mixture. Nevertheless, the tensile strength and the modulus of the "wet" plaques nearly remained constant, which was less than 20% of the original values, up to 50 wt % of BPEA.

Figure 5A:
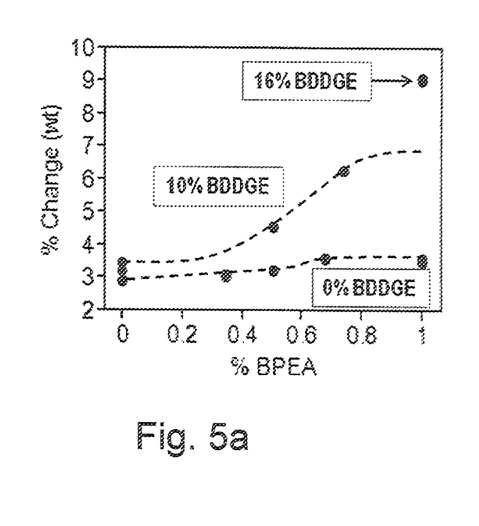
FIGS. 5a and 5b are graphs showing how blending different amounts of BPEA hardener and a hydrophobic amine hardener affects water absorption of cured coatings in terms of weight change and tensile strength characteristics.
Figure 5B:
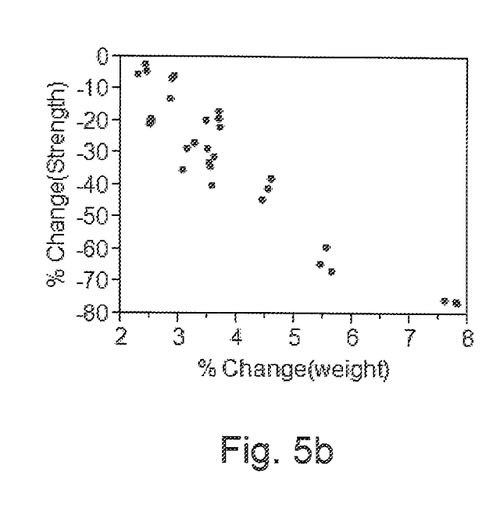

The hygroscopic tendency was intensified in the presence of reactive diluents such as 1,4-butanediol diglycidyl ether (BDDGE). FIG. 5 (a) shows water absorption is a very strong function of the amount of BPEA and BDDGE in the formulation. % water in the cured plaque soared as high as 9% with 16.1% BDDGE in the formulation of Ex2. Presumably, incomplete cure of BDDGE might facilitate water permeation through the plaque. FIG. 5 (b) indicates that the tensile strength has a strong relationship to water absorption. In order to keep a loss of tensile strength below 30% in the wet condition, maximum water absorption should be restricted lower than approximately 3.5%.

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A curable composition, comprising:
   an epoxy functional component including at least one epoxy functional ingredient having an average of at least 1.5 epoxy moieties per molecule, and
   an amine functional component including at least one polycyclic polyamine and one or more additional polyamines that are more hydrophobic than the at least one polycyclic polyamine, wherein the at least one polycyclic polyamine comprises the formula wherein:
(a) each X is independently a divalent linking group;
(b) each Q independently is H, a monovalent moiety, or a co-member of a ring structure with another Q;
(c) each Z independently is H or a monovalent moiety optionally incorporating one or more heteroatoms and/or substituents that comprise amine functionality or are substantially inert with respect to amine functionality; with the proviso that one or more of Z and/or Q are selected such that the polycyclic polyamine comprises on average greater than 1.5 active amine moieties per molecule; and
(d) R is H, a monovalent moiety optionally incorporating one or more heteroatoms and/or substituents that comprise amine functionality or are substantially inert with respect to amine functionality; or has the formula wherein Y is a single bond or a divalent linking group having the same definition as X, and each Q and Z independently is as defined above.

2. The composition according to claim 1 wherein the polycyclic polyamine comprises at least one amine having a formula selected from one or more of:

-continued

3. The coating composition according to claim 1, wherein the polycyclic polyamine comprises BPEA.

4. The composition of claim 1, wherein the epoxy functional ingredient comprises on average at least 2 epoxy moieties per molecule.

5. The composition of claim 1, wherein the at least one additional polyamine is selected from one or more of a polyether polyamine, an ethyleneamine, and combinations of these.

6. The composition of claim 1, wherein the at least one additional polyamine is selected from one or more of AEP, TETA, L-TETA, TAEA, TEPA, PEHA, EDA, PEEDA, L-TEPA, DETA, and combinations of these.

7. The composition of claim 1, wherein each X is independently a divalent hydrocarbyl moiety of 1-10 carbon atoms.

8. The composition of claim 7 wherein the polycyclic polyamine comprises bis(2-(piperazin-1-yl)ethyl)amine (BPEA), bis(3-(piperazin-1-yl)propyl)amine, bis(4-(piperazin-1-yl)butyl)amine, bis(5-(piperazin-1-yl)pentyl)amine, bis(6-(piperazin-1-yl)hexyl)amine, bis(1-(piperazin-1-yl)propan-2-yl)amine, bis(2-(piperazin-1-yl)propyl)amine, or mixtures thereof; or 2-(4-(2-(piperazin-1-yl)ethyl)piperazin-1-yl)ethanamine, 3-(4-(3-(piperazin-1-yl)propyl)piperazin-1-yl)propan-1-amine, 4-(4-(4-(piperazin-1-yl)butyl)piperazin-1-yl)butan-1-amine, 5-(4-(5-(piperazin-1-yl)pentyl)piperazin-1-yl)pentan-1-amine, 6-(4-(6-(piperazin-1-yl)hexyl)piperazin-1-yl)hexan-1-amine, 1-(4-(1-(piperazin-1-yl)propan-2-yl)piperazin-1-yl)propan-2-amine, 2-(4-(2-(piperazin-1-yl)propyl)piperazin-1-yl)propan-1-amine, or mixtures thereof.

9. A coated article comprising:
a) a substrate; and
b) a coating system provided on at least a portion of a surface of the substrate, said coating system comprising at least one cured coating layer derived from the curable composition of claim 1.

10. A coated pipeline, comprising:
a) a pipe comprising a metallic surface; and
b) a coating system provided on at least a portion of the metallic surface of the substrate, said coating system comprising at least one cured coating layer derived from the curable composition of claim 1.

11. A method of forming a coating system on a substrate, comprising the steps of:
a) providing a substrate comprising a heated, metallic surface;
b) applying an epoxy functional powder onto at least a portion of the heated surface under conditions such that the powder forms a first, melted, fluid coating on the metallic surface;
c) while the melted, fluid coating is in an at least partially fluid state, applying the curable composition of claim 1 onto the coated, heated, metallic surface to form a second coating on the heated, metallic surface, and
d) curing the first and second coatings.
12. A curable composition, comprising:
(i) an epoxy functional component including at least one epoxy functional ingredient having an average of at least 1.5 epoxy moieties per molecule, and
(ii) at least one polycyclic polyamine of the formula wherein:
(a) each X is independently a divalent hydrocarbyl moiety of 1-10 carbon atoms;
(b) each Q independently is H, a monovalent moiety, or a co-member of a ring structure with another Q;
(c) each Z independently is H or a monovalent moiety optionally incorporating one or more heteroatoms and/or substituents that comprise amine functionality or are substantially inert with respect to amine functionality; with the proviso that one or more of Z and/or Q are selected such that the polycyclic polyamine comprises on average greater than 1.5 active amine moieties per molecule; and
(d) R is H, a monovalent moiety optionally incorporating one or more heteroatoms and/or substituents that comprise amine functionality or are substantially inert with respect to amine functionality; or has the formula wherein Y is a single bond or a divalent linking group having the same definition as X, and each Q and Z independently is as defined above; and
(c) one or more additional polyamines different than and more hydrophobic than the at least one polycyclic polyamine,
wherein the curable composition can provide a cured material that is less hygroscopic than a cured material without component (c).

* * * * *